(12) United States Patent
Lumpkin

(10) Patent No.: US 8,136,827 B2
(45) Date of Patent: Mar. 20, 2012

(54) BELT DRIVE SYSTEM

(75) Inventor: Wayne R. Lumpkin, Littleton, CO (US)

(73) Assignee: The Gates Corporation, Denver, CO (US)

( * ) Notice: Subject to any disclaimer, the term of this patent is extended or adjusted under 35 U.S.C. 154(b) by 110 days.

(21) Appl. No.: 12/640,304

(22) Filed: Dec. 17, 2009

(65) Prior Publication Data

US 2011/0049831 A1    Mar. 3, 2011

Related U.S. Application Data

(60) Provisional application No. 61/238,944, filed on Sep. 1, 2009.

(51) Int. Cl.
| | |
|---|---|
| B62M 9/02 | (2006.01) |
| B62M 1/02 | (2006.01) |
| F16H 55/17 | (2006.01) |
| F16H 7/02 | (2006.01) |

(52) U.S. Cl. .................... 280/261; 198/834; 474/152

(58) Field of Classification Search ............ 474/153, 474/148, 205; 305/115; 198/834
See application file for complete search history.

(56) References Cited

U.S. PATENT DOCUMENTS

| | | | | |
|---|---|---|---|---|
| 438,124 | A * | 10/1890 | Warwick | 280/261 |
| 585,416 | A * | 6/1897 | Wattles | 474/167 |
| 3,338,107 | A * | 8/1967 | Kiekhaefer | 474/153 |
| 3,472,563 | A | 10/1969 | Irgens | |
| 3,888,132 | A * | 6/1975 | Russ, Sr. | 474/153 |
| 4,072,062 | A | 2/1978 | Morling et al. | |
| 4,099,737 | A * | 7/1978 | Waugh | 280/261 |
| 4,119,326 | A * | 10/1978 | Porter | 280/236 |
| 4,634,409 | A | 1/1987 | Johnson | |
| 4,846,489 | A * | 7/1989 | Kleinebenne | 280/261 |
| 6,848,757 | B2 | 2/2005 | Ueno | |
| 7,144,345 | B2 | 12/2006 | Edamatsu | |
| D544,894 | S | 6/2007 | Clarke | |
| D545,333 | S | 6/2007 | Clarke | |
| 7,235,028 | B2 | 6/2007 | Martin | |
| 7,254,934 | B2 | 8/2007 | Wu | |
| D592,107 | S | 5/2009 | Clarke | |

FOREIGN PATENT DOCUMENTS

| | | |
|---|---|---|
| CN | 2902887 Y | 5/2007 |
| DE | 3307391 A1 | 9/1984 |
| DE | 10326512 A1 | 12/2004 |
| EP | 0061145 A1 | 9/1982 |
| GB | 2124729 A1 | 2/1984 |

* cited by examiner

*Primary Examiner* — Tony Winner
(74) *Attorney, Agent, or Firm* — J. A. Thurnau, Esq.; T. A. Dougherty, Esq.; P. N. Dunlap, Esq.

(57) ABSTRACT

A self aligning belt drive system comprises a belt drive having a plurality of longitudinally spaced inner lobes each having an alignment groove. The system further comprises at least one pulley comprising a frame configured to rotate about a rotation axis and having a circular outer rim. A plurality of circumferential teeth extend radially and axially of the rim with each tooth being configured to be received between adjacent inner lugs of the drive belt. An alignment flange extends radially between circumferential teeth. The alignment flange is configured to be received in the alignment groove and the alignment flange extends no further radially from the rotational axis than the circumferential teeth. The circumferential teeth, the alignment flange and the alignment groove are configured so that with the alignment flange received in the alignment groove, the drive belt rides on the circumferential teeth.

36 Claims, 9 Drawing Sheets

BELT DRIVE SYSTEM

RELATED APPLICATIONS

This application claims priority from U.S. Provisional Patent Application Ser. No. 61/238,944, filed Sep. 1, 2009, entitled "Belt Drive System for a Bicycle," which is hereby incorporated by reference.

TECHNICAL FIELD

Belt drive systems and more particularly belt drive systems for cycles.

BACKGROUND

The overwhelming majority of cycles, including motorcycles and bicycles, made, sold and used throughout the world utilize a drive train with a conventional chain providing power between a first pulley operatively associated with a drive shaft and a second pulley operatively associated with a hub of a rear wheel. In bicycle applications, the first pulley is operatively associated with a crank set. These chains are relatively effective at transmitting power between the first and second pulleys, but they are not without shortcomings. The shortcomings include, but are not limited to, the need to periodically be lubricated, the fact that with wear the chains become less efficient in transmitting power, debris can lodge between chain links diminishing efficiency, the chains stretch with extended use and need to be periodically replaced and may further wear the teeth of the first or second pulleys requiring their replacement as well and chains can be noisy.

One known alternative to chain-based drive train systems are belt drive train systems. Belt drive systems overcome a number of the problems discussed above, but are not without their own problems. For example, belt drive systems generally require relatively precise alignment between first and second pulleys of the belt drive system. Providing such alignment can be difficult particularly in bicycles, where crank sets and hubs of various manufacturers can be mixed and matched in bicycle assembly, resulting in less than precise alignment. In addition, incidents may happen during use of the bike that degrades the alignment. As a result of a loss of a precise alignment, the belts of known belt drive systems can wander relative to the pulley and fall off the pulley. This problem is exacerbated because the belts and pulleys are relatively narrow relative to the belt length. One known way of addressing this misalignment is to provide one or more radially extending side flanges around the circumference of the pulley to prevent the belt from wandering off the pulley. However, such side flanges, particularly where two side flanges are provided, complicate the manufacture of the pulley, increase weight, make the pulley wider and increases the cost of the pulleys. A further problem with known belt drive systems is collection of debris between teeth of the pulleys which can interfere with effective force transmission and, in extreme cases, cause a belt to slip off a pulley. Each of these disadvantages is significant for cycle applications and particularly bicycle applications.

The various embodiments described herein are intended to overcome one or more of the problems discussed above.

SUMMARY OF THE EMBODIMENTS

A first aspect is self aligning belt drive system comprises a belt drive having a plurality of longitudinally spaced inner lobes each having an alignment groove. The system further comprises at least one pulley comprising a frame configured to rotate about a rotation axis and having a circular outer rim. A plurality of circumferential teeth extend radially and axially of the rim with each tooth being configured to be received between adjacent inner lugs of the drive belt. An alignment flange extends radially between circumferential teeth. The alignment flange is configured to be received in the alignment groove and the alignment flange extends no further radially from the rotational axis than the circumferential teeth. The circumferential teeth, the alignment flange and the alignment groove are configured so that with the alignment flange received in the alignment groove, the drive belt rides on the circumferential teeth.

Another aspect is a pulley and drive belt system for a bicycle comprising a drive belt with a plurality of longitudinally spaced inner lugs each having an alignment groove. A first pulley is configured to engage the inner surface of the drive belt and comprises a frame configured for connection to a crank of a bicycle for rotation about a rotation axis. The frame further includes a circular outer rim having a plurality of circumferential teeth extending radially and axially of the rim. The teeth extend axially a tooth width at least equal to a width of the drive belt. Each tooth is configured to be received between adjacent inner lugs of the drive belt. A second pulley is configured to engage the inner surface of the drive belt and comprises a frame configured for connection to the bicycle wheel hub for rotation about a rotation axis. The frame has a circular outer rim with a plurality of circumferential teeth extending radially and axially of the rim. The teeth extend axially a tooth width at least as wide as the width of the drive belt and each tooth is configured to be received between adjacent inner lugs of the drive belt. At least one of the first and second pulleys comprises an alignment flange extending between adjacent circumferential teeth, the alignment flange being configured to be received in the alignment groove.

Yet another aspect is a bicycle comprising the pulley and drive belt system of the preceding paragraph.

A further aspect is a pulley for use with a drive belt, the drive belt comprising a plurality of longitudinal spaced inner lugs each having an alignment groove dividing the lug into first and second lug segments. The pulley comprises a frame configured to rotate about a rotation axis, the frame having a circular outer rim with opposing sides. A plurality of circumferential teeth extend radially and axially of the rim, each tooth having a tooth width at least equal to the width of the drive belt. Each tooth is configured to be received between an adjacent inner lug of the drive belt. An alignment flange extends between adjacent circumferential teeth, the alignment flange being configured to be received in the alignment groove. The alignment flange extends radially no further than the circumferential teeth from the rotational axis.

Yet another aspect is a kit for a bicycle comprising at least two of a drive belt, a first pulley and a second pulley. The drive belt comprises a plurality of longitudinally spaced inner lugs each having an alignment groove dividing the lug into first and second lug segments. The alignment groove has an alignment groove depth. The first and second pulleys are each configured to engage a surface of the drive belt and at least one of the first and second pulleys comprises a frame configured to rotate about a rotation axis. The frame has a circular outer rim. A plurality of circumferential teeth extend radially and axially of the rim, each tooth having a tooth width parallel to the rotation axis and each tooth being configured to be received between adjacent lugs of the drive belt. An alignment flange extends radially between adjacent circumferential teeth. The alignment flange is configured to be received in the alignment groove and the alignment flange extends no further radially than the circumferential teeth from the rotation axis. The circumferential teeth, the alignment flange and the alignment groove are configured so that with the alignment flange received in the alignment groove, the drive belt rides on the circumferential teeth.

A further aspect is the use of a belt for a bicycle drive system for a bicycle, with drive system being configured as described in any of the preceding paragraphs. The belt comprises a plurality of longitudinally spaced inner lugs extending a width of the belt, each lug having a an alignment groove dividing the lug into first and second lug segments, and the alignment groove having a width less than ⅓ the width of the belt. In one embodiment the belt has a width of about 11 mm and the alignment groove has a width of between about 1-2 mm.

Yet a further aspect is the use of a pulley for a bicycle drive system for a bicycle as described in any of the preceding paragraphs, the pulley comprising a frame configured to rotate about a rotation axis, the frame having a circular outer rim with opposing sides. The pulley further includes a plurality of circumferential teeth evenly spaced at a pulley pitch extending radially and axially of the rim, each tooth having a width parallel to the rotation axis, the width being at least equal to a width of the drive belt, and each tooth being configured to be received between adjacent inner lugs of the drive belt. An alignment flange extends between adjacent circumferential teeth, the alignment flange being configured to be received in an alignment groove of the belt, the alignment flange extending radially no further than the circumferential teeth from the rotation axis. The pulley for use with a drive belt may further comprise the alignment flange having a width that is substantially constant as it extends radially to a rounded distal end. The pulley may further comprise the alignment flange having a width less than ⅓ the width of the teeth.

DETAILED DESCRIPTION

Unless otherwise indicated, all numbers expressing quantities of ingredients, dimensions reaction conditions and so forth used in the specification and claims are to be understood as being modified in all instances by the term "about".

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

The belt drive system disclosed herein can have application to a wide variety of apparatus utilizing belt drives, including, but not limited to, cycles such as motorcycles and bicycles. Because of the particular advantages of the belt drive system for use with bicycles, the belt drive system is illustrated in use with a bicycle. This specific embodiment is intended to be non-limiting unless expressly limited by the scope of the attached claims.

Figure 1:
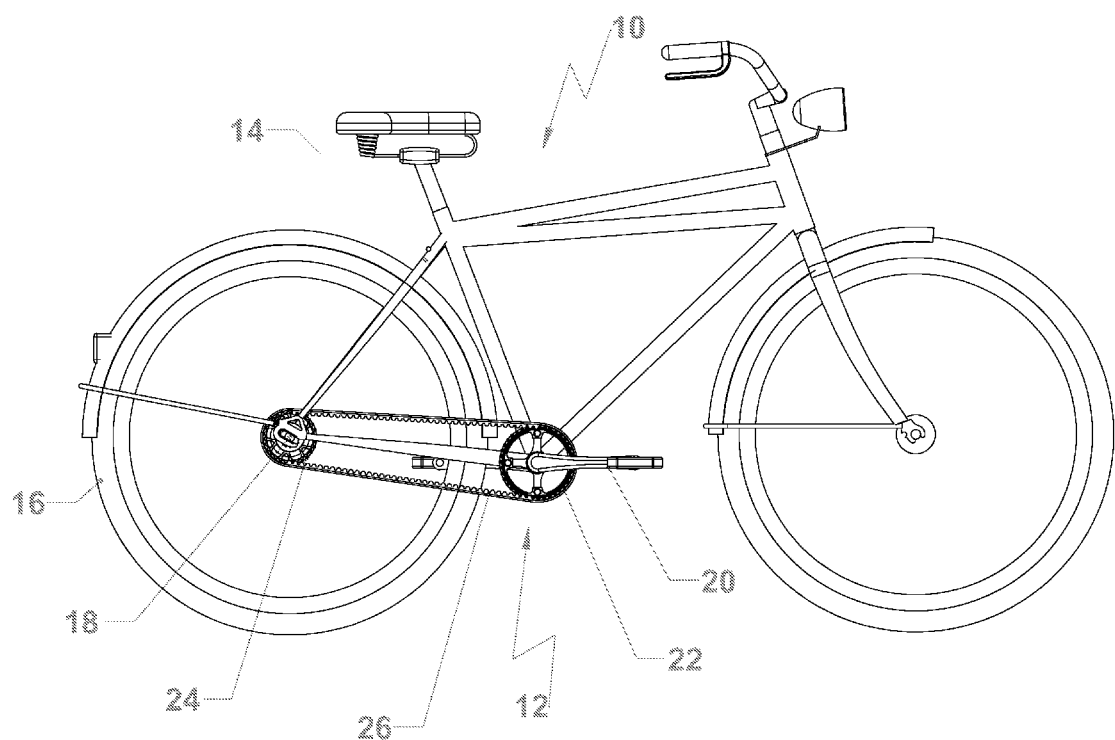
FIG. 1 is a schematic plan view of a cycle, in particular a bicycle including a pulley and drive belt system.

A bicycle 10 having a drive belt system 12 is schematically illustrated in FIG. 1. The bicycle 10 includes a frame 14 with a rear wheel 16 having a hub 18 attached to the frame by a rear drop out (not shown). The bicycle 10 further includes a crank set 20. The belt drive system 12 includes a first pulley 22, which is operatively associated with the crank set 20 to rotate about a common rotation axis with the crank set 20. A second pulley 24 is operatively associated with the rear wheel hub 18 to rotate about a common rotation axis. A synchronous drive belt 26 extends between the first pulley 22 and the second pulley 24. As illustrated in FIG. 1 the first pulley 22 may have a diameter greater than the second pulley. In other embodiments the pulleys may be of the same size or the second pulley may have a diameter greater than the first pulley. In addition, one or more additional coaxial pulleys may be provided adjacent the first or second pulley to provide for varying gear ratios. Such an embodiment may further include a front or rear derailleur to enable shifting between adjacent pulleys. Or gearing may be provided by means of geared rear hub of the type known in the art.

Figure 2:
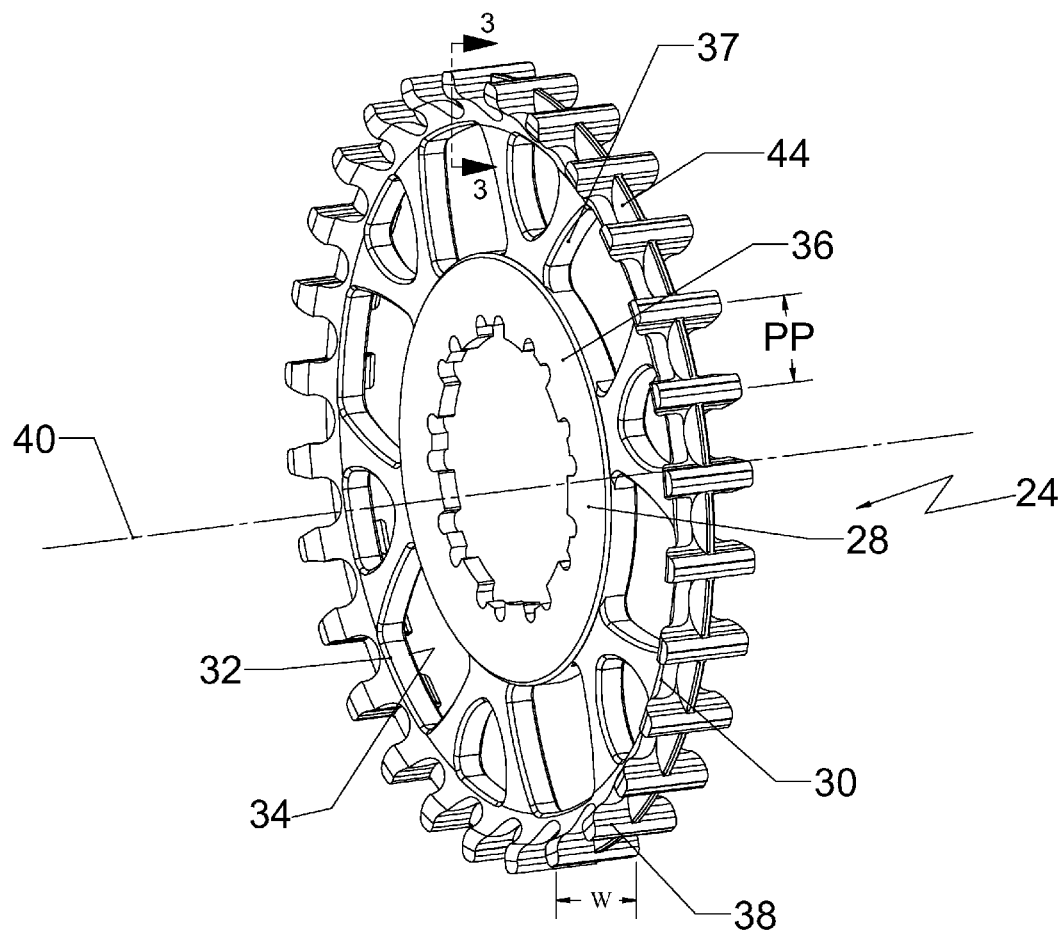
FIG. 2 is a perspective view of the second pulley of FIG. 1.

FIG. 2 is a perspective view of the second pulley 24 removed from the hub 18 and the belt drive system 12. The second pulley 24 comprises a frame 28 configured for connection to the hub 18 of the rear wheel 16 and includes a circular outer rim 30 with opposing sides 32, 34, a hub connection ring 36 and a plurality of spokes 37 extending between the hub connection ring 36 and the circular outer rim 30. The second pulley 24 further comprises a plurality of circumferential teeth 38. As illustrated, the circumferential teeth are evenly spaced at a pulley pitch PP and extend radially and axially of the rim. In other embodiments, the teeth may have variable spacing to mate with a drive belt having variably spaced lugs.

Figure 5:
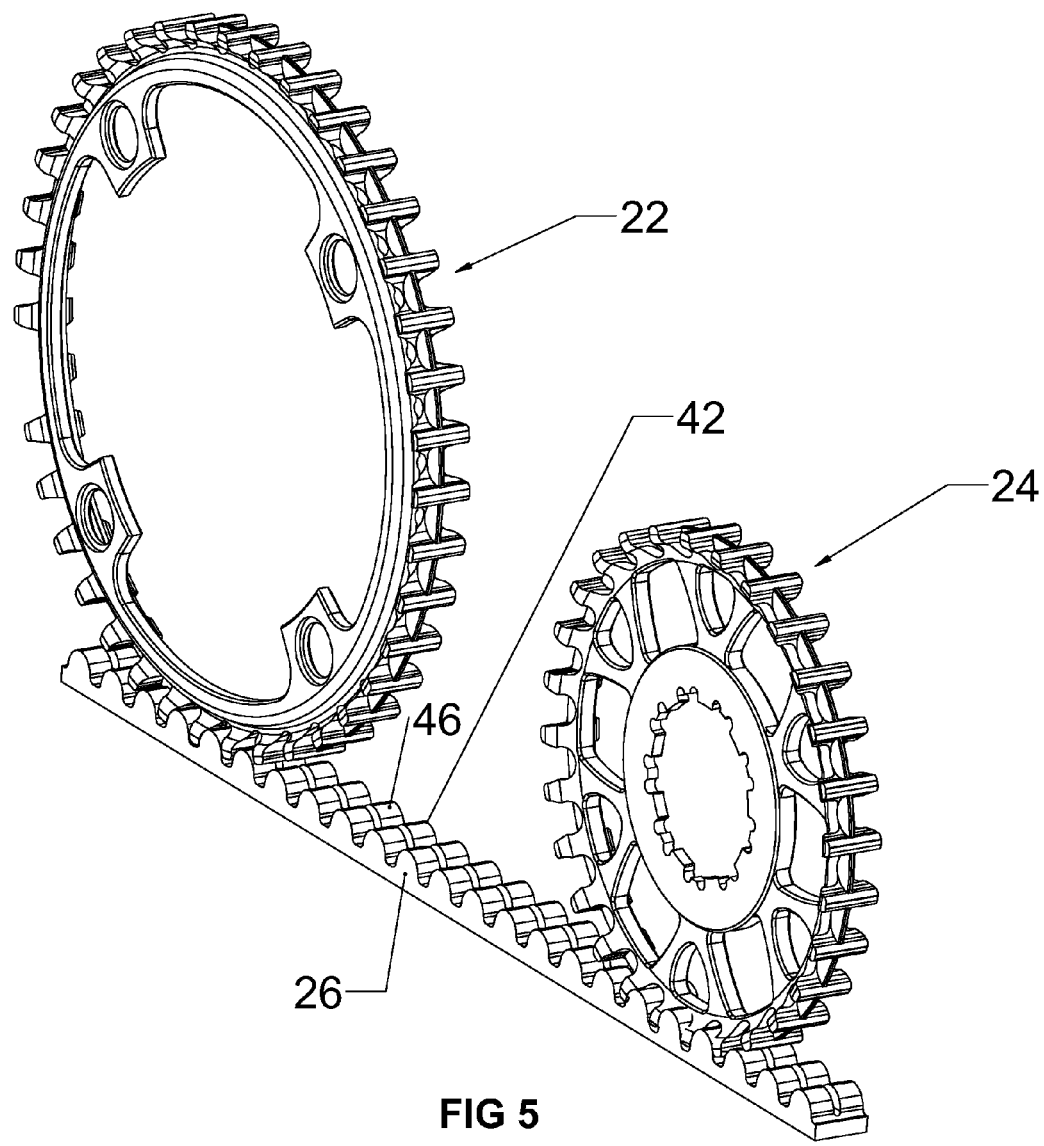
FIG. 5 is a perspective view of the first and second pulleys of FIG. 1 engaged with a drive belt.
Figure 6:
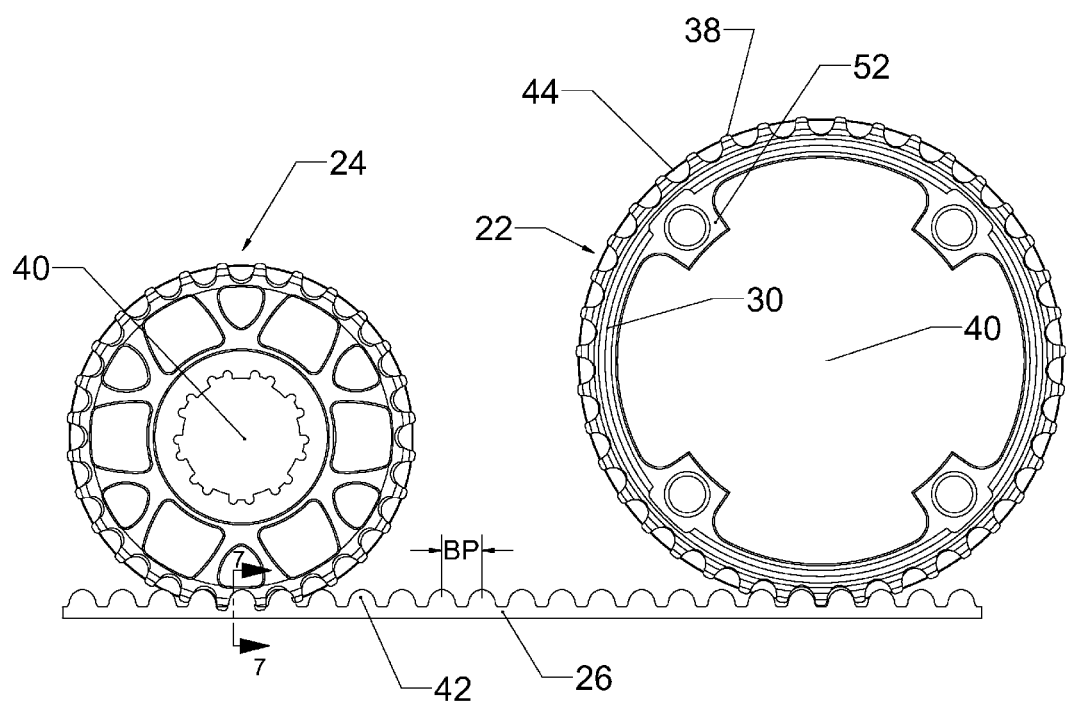
FIG. 6 is a side elevation view of the pulley and drive belt system of FIG. 5.
Figure 7:
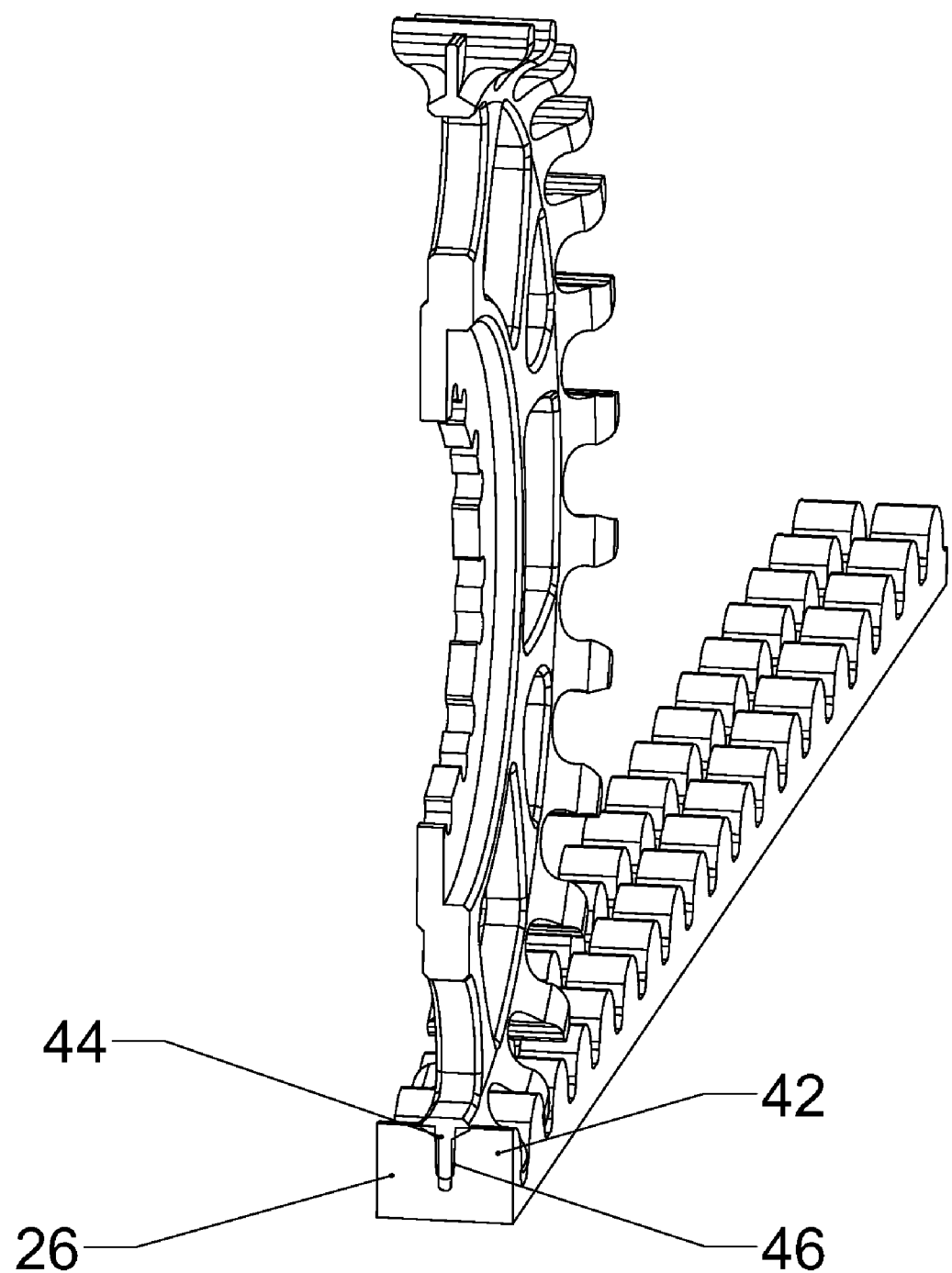
FIG. 7 is a cross-section of the second pulley of FIG. 6 taken along line 7-7 of FIG. 6.

Each tooth further has a width W parallel to the rotation axis. The width W is at least equal to the width of the drive belt 26, though in some embodiments it may be equal, more or less than the width of the drive belt. It can be advantageous for the tooth width and belt width to be substantially equal to maximize the amount of force transmitted between the belt and teeth while minimizing the respective width of the belt and teeth. Each tooth 38 is configured to be received in a space between adjacent inner lugs 42 of a drive belt 26 as illustrated in FIGS. 5 and 6. In some embodiments, as illustrated in FIGS. 5 and 6, the teeth substantially fill the space between adjacent lugs. This feature can be useful to minimize slippage between the belt and pulley if the direction of rotation of the pulley reverses. These inner lugs are spaced a belt pitch BP. The second pulley 24 includes an alignment flange 44 extending between adjacent circumferential teeth. The alignment flange 44 is configured to be received in an alignment groove 46 of the drive belt 26, which divides each lug into first and second lug segments. See FIGS. 5-7. Referring to FIG. 7, the alignment groove 46 can have parallel side walls. In other embodiments the side walls can be tapered to facilitate receiving the alignment flange 44 therein. Furthermore, the alignment flange 44 may be tapered to facilitate mating with the centering groove. Whether tapered or not, alignment flange 44 may further include a distal end that is rounded or otherwise configured to facilitate such mating. In the illustrated embodiment and as seen in FIG. 7, the alignment groove 46 divides the lugs 42 into equal first and second lug segments. However, the first and second lug segments could be of different widths in other embodiments. In the illustrated embodiment, each tooth of the second pulley 24 extends lengthwise an equal distance from each side of the rim. In embodiments where the first and second lug segments are of different widths, the teeth would generally have corresponding different widths. In the illustrated embodiment, each tooth of the second pulley 24 extends radially beyond the alignment flange 44 from the rotation axis (see FIG. 6), though in other embodiments they can extend the same distance or the alignment flange 44 could extend further. In some embodiments the circumferential teeth, the alignment flange and the alignment groove are configured so that with the alignment flange received in the alignment groove, the drive belt rides on the circumferential teeth. Alternatively, the circumferential teeth, the alignment flange and the alignment groove may be configured to also ride on the alignment flange.

Figure 9:
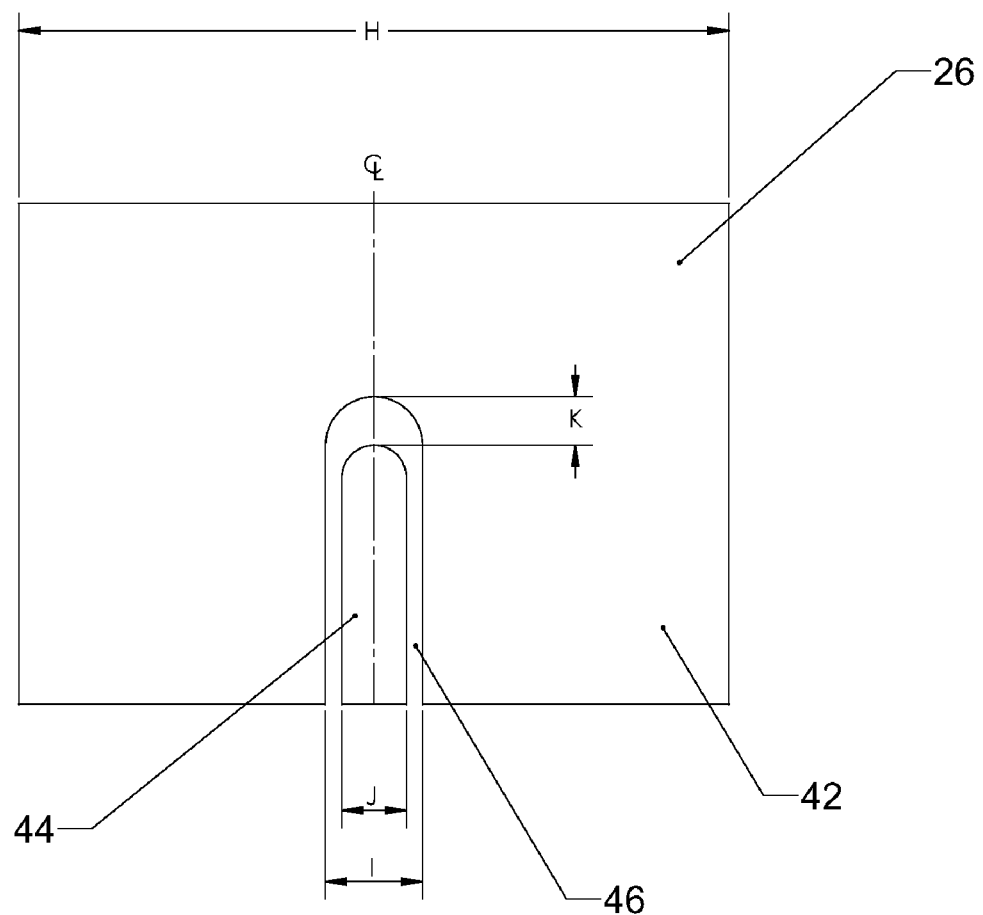
FIG. 9 is a cross-section of a belt lug-pulley tooth engagement.

FIG. 9 illustrates an embodiment wherein the alignment flange has parallel sidewalls and a rounded distal end. In this embodiment the pulley has a width H of about 11 mm and the teeth have a width of about 11 mm. In most embodiments the width of the teeth is at least equal to the width of the belt. In FIG. 9, the alignment groove has a width I of about 1.5 mm and the alignment flange has a width J of about 1.0 mm. Generally the alignment groove width is slightly larger than the alignment flange width to provide some engagement clearance, but should not be so much wider to allow the belt to wander an undesirable amount along the width of the teeth. Generally, the width of the alignment groove is minimized to maximize the amount of belt surface available to engage the teeth and maximize the surface for force transmission therebetween. Minimizing the width of the alignment groove also minimizes the likelihood of debris entering the alignment groove. Assuming a belt width of about 11 mm, in some embodiments an alignment groove width may be between about 1-3 mm, in other embodiments about 1-2 mm and in other embodiments about 1-1.5 mm. The alignment flange generally would have a width of about 0.5 mm less than the alignment groove.

In some embodiments the ratio of the width of the alignment groove to the belt width can be as great as 1:3. In other embodiments it can be 1:4. In still other embodiments it can be 1:8, 1:10 or even smaller. The ratio of the width of the alignment flange to the width of the teeth can also be 1:3, 1:4, 1:10 or even smaller.

As seen in FIG. 9, the alignment flange is configured so that it does not extend to the bottom of the alignment groove. In the embodiment of FIG. 9 there is a distance of about 0.75 mm between the distal end of the flange and the bottom of the alignment groove. This configuration is useful where the belt and pulley drive system is used in an environment where debris may be present, such as mountain biking. This space provides for accumulation of some debris without filling the alignment groove and possibly forcing the belt off the pulley. In other applications where debris accumulation is of little concern, the alignment flange can be configured to extend the full depth of the alignment groove. In most embodiments it is desirable that the alignment flange not extend so far into the alignment groove that the belt rides on the alignment flange to the exclusion of the surface of the pulley teeth.

Figure 8:
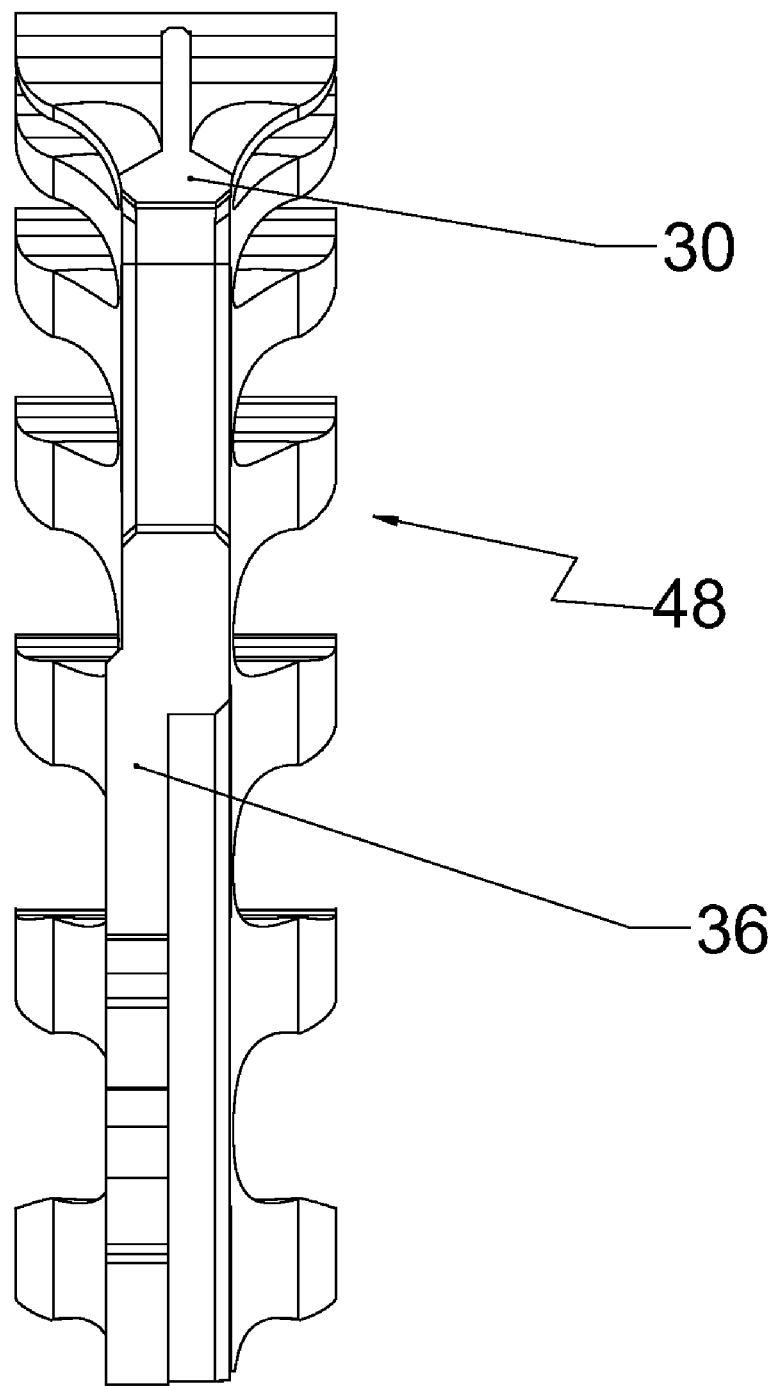
FIG. 8 is a cross-section of a segment of a pulley illustrating an axial offset.

Referring to FIG. 8, an axial offset 48 of a select distance (e.g., 2 mm) is provided between the connection ring 36 and the rim 30. In one embodiment, the offset 48 is provided between the connection ring 36 and the plurality of spokes 37 by a step as illustrated in FIG. 8. Alternatively, the offset may be provided by an angular offset or any other manner. The purpose of this offset is so that on attachment of the connection ring to the hub the position of the rim along the rotation axis can be varied depending on which of the opposing rim sides is leading during attachment.

The first pulley 22 has an identical configuration of the circular outer rim 30, teeth 38 and alignment flange 44, but may be, as illustrated in FIG. 6, of a different diameter and further may include a different frame structure. Referring to FIGS. 5 and 6, the frame 50 of the first pulley 22 consists of a number of radially spaced inwardly extending brackets 52 that further form a means for operative association with the crank set. These brackets may have an offset in a like manner of the axial offset 48 illustrated in FIG. 8 with regard to the second pulley 24. The holes 54 provide for attachment to the crank set 20.

In some embodiments of a drive system as disclosed herein, only the first pulley 22 or the second pulley 24 may include an alignment flange. It may also be desirable in some embodiments to not have an alignment flange extend between all the adjacent teeth. In some embodiments, the alignment flange may simply be a radial extension of the rim as opposed to a flange extending radially from the rim. In some embodiments, only a single pulley may be used with a drive belt.

In use in the particular application of a bicycle, lugs 46 of the synchronous drive belt 26 are received in the space between adjacent teeth of each of the first and second pulleys 22, 24, whereby the rear wheel can be driven by application of force to the crank set. Alignment is maintained on the first and second pulleys 22, 24 by the alignment flange 44 mating with the alignment groove 46 of the belt. In this manner, side flanges required in conventional belt pulleys used on bicycles can be eliminated. This has the advantage of decreasing the width of the pulleys, which is critical with the small space available in bicycle assembly. Eliminating the side flanges further decreases the weight of the pulleys, another critical factor in bicycle design. The alignment feature allows for relative axial displacement between the first and second pulleys, which is common in bicycles where frames may not be built to exacting specifications and where damage may occur to the frame or pulleys which would otherwise cause pulleys to become out of alignment. Furthermore, bicycle manufactures may choose to use crank sets and wheel sets of various manufactures and the respective dimensions may vary somewhat, which could cause some misalignment of the pulleys. This potential misalignment can be compensated by providing the axial offsets in the first and second pulleys as described above and further by virtue of interaction of the alignment grooves and alignment flanges. These advantages can be enjoyed in other applications such as motor cycles or other devices utilizing belt drive systems.

Figure 3:
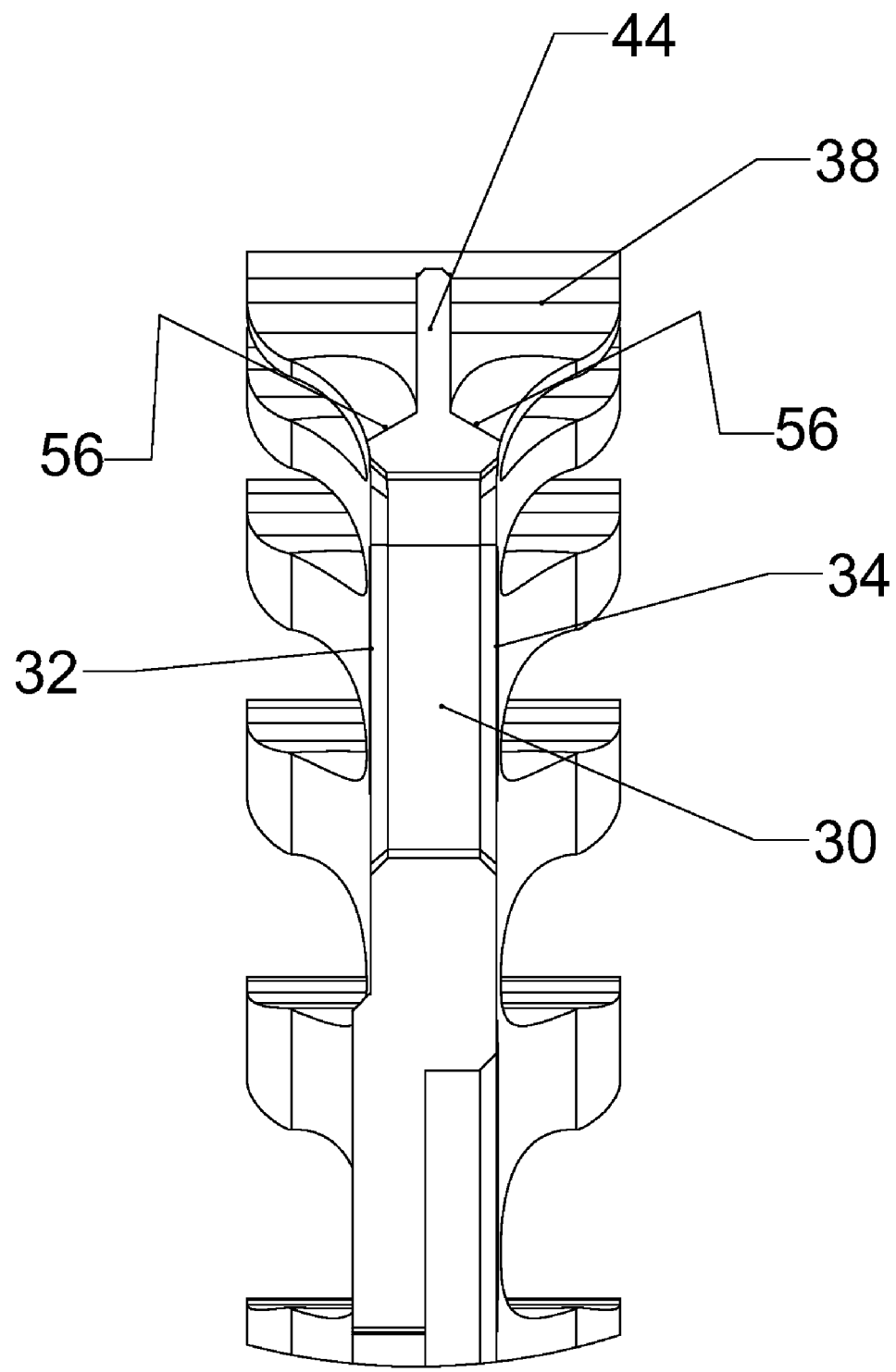
FIG. 3 is a cross-section of the second pulley of FIG. 2 taken along line 3-3.
Figure 4:
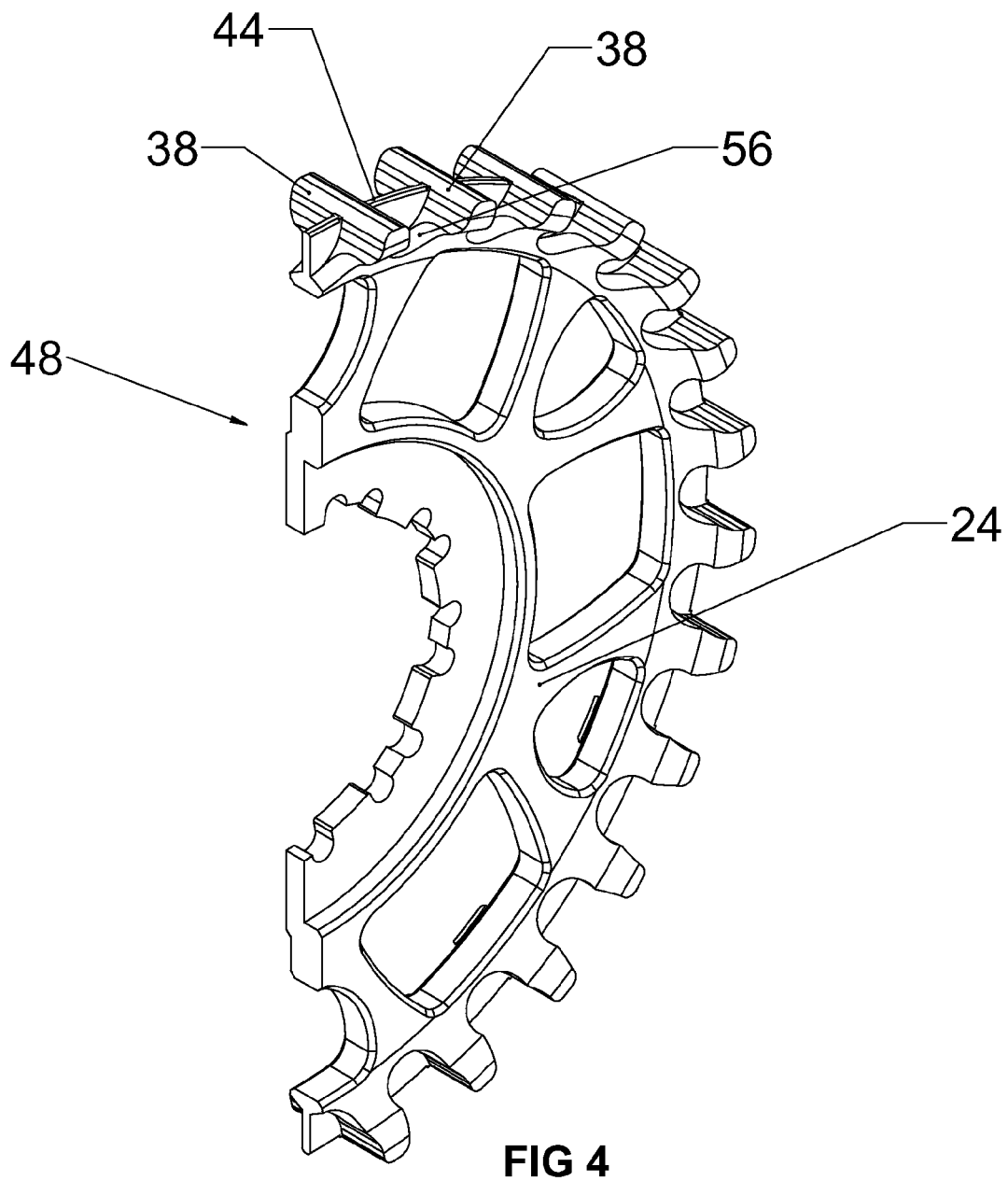
FIG. 4 is a perspective view of the cross-section of FIG. 3.

A further advantage of this design is the ability of mud and debris to be shed in the area of the teeth. This feature is further facilitated by debris evacuating path 56 which extend between each opposing side 32, 34 of the circular outer rim 30 and the alignment flange 44, as best viewed in FIGS. 3 and 4. The debris evacuating path is intended to eliminate obstacles to debris clearing the pulley. As seen in these figures, the debris evacuating path 56 is inclined from the opposing side to the alignment flange 44 in a manner that facilitates clearing of debris and prevents blockage by a shoulder of the pulley rim. A curved surface or other configurations could also perform this evacuating function. Further, the alignment flange 44 may block debris from entering the space between adjacent teeth to begin with.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A self-aligning pulley and drive belt system comprising:
    a drive belt, the drive belt comprising a plurality of longitudinally spaced inner lugs each having an alignment groove dividing the lug into first and second lug segments, the alignment groove having an alignment groove depth; and
    at least one pulley configured to engage an inner surface of the drive belt, the at least one pulley comprising:
    a frame configured to rotate about a rotation axis, the frame having a circular outer rim with opposing sides;
    a plurality of circumferential teeth extending radially and axially of the rim, each tooth having a tooth width and each tooth being configured to be received between adjacent inner lugs of the drive belt; and
    an alignment flange extending radially between adjacent circumferential teeth, the alignment flange being configured to be received in the alignment groove, and the alignment flange extending no further radially from the rotation axis than the circumferential teeth,
    the circumferential teeth, the alignment flange and the alignment groove being configured so that with the alignment flange received in the alignment groove, the drive belt rides on the circumferential teeth.

2. The self-aligning pulley and belt drive system of claim 1 further comprising the circumferential teeth, the alignment flange and the alignment groove being configured so that with the alignment flange received in the alignment groove, the drive belt also rides on the alignment flange.

3. The self-aligning pulley and belt drive system of claim 1 further comprising a debris evacuating path extending between at least one opposing side of the outer rim and the alignment flange, the debris evacuating path being free of obstacles between the at least one opposing side of the outer rim and the alignment flange.

4. The self-aligning pulley and belt drive system of claim 3 wherein the debris evacuating path is inclined between the at least one opposing side of the outer rim and the alignment flange.

5. The self-aligning pulley and belt drive system of claim 1 further comprising the alignment groove extending longitudinally of the drive belt and the alignment flange extending essentially perpendicular to the width of the teeth.

6. The self-aligning pulley and belt drive system of claim 1 wherein the alignment groove is in the center of the lug and each tooth extends widthwise an equal distance from each rim side.

7. The self-aligning pulley and belt drive system of claim 1 wherein each tooth extends radially beyond the alignment flange from the rotation axis.

8. The self-aligning pulley and belt drive system of claim 1 wherein each tooth is configured to essentially fill a space between adjacent lugs.

9. The self-aligning pulley and belt drive system of claim 1 wherein the pulley frame of the at least one pulley further comprises a plurality of spokes between the rim and a connection ring, there being an axial off-set of a select distance between the connection ring and the rim, whereby upon attachment of the connection ring to a rotating member a position of the rim along the rotation axis can be varied depending upon which of the opposing rim sides is leading.

10. The self-aligning pulley and belt drive system of claim 1 comprising at least two pulleys.

11. The self-aligning pulley and belt drive system of claim 10 wherein each pulley has a different diameter.

12. The self-aligning pulley and belt drive system of claim 1 further comprising the alignment flange having a width that is substantially constant as it extends radially to a rounded distal end.

13. The self-aligning pulley and belt drive system of claim 1 further comprising drive belt having a drive belt width and the alignment groove having an alignment groove width less than ⅓ the drive belt width.

14. The self-aligning pulley and belt drive system of claim 1 further comprising drive belt having a drive belt width and the alignment groove having an alignment groove width less than ¼ the drive belt width.

15. The self-aligning pulley and belt drive system of claim 1 further comprising drive belt having a drive belt width and the alignment groove having an alignment groove width less than ⅛ the drive belt width.

16. The self-aligning pulley and belt drive system of claim 1 further comprising drive belt having a drive belt width and the alignment groove having an alignment groove width less than 1/10 the drive belt width.

17. The self-aligning pulley and belt drive system of claim 1 further comprising a clearance between a width of the alignment groove and a width of the alignment flange.

18. The self-aligning pulley and drive belt system of claim 1 further comprising the alignment flange extending radially an alignment flange distance that extends a distal end of the alignment flange into the alignment groove a distance no greater than a depth of the alignment groove.

19. The self-aligning pulley and drive belt system of claim 18 further comprising the alignment flange extending radially the alignment flange distance that extends a distal end of the alignment flange into the alignment groove a distance less than a depth of the alignment groove.

20. The self-aligning pulley and drive belt system of claim 1 wherein the belt has a width of about 11 mm.

21. A self-aligning pulley and drive belt system comprising:
    a drive belt, the drive belt comprising a plurality of longitudinally spaced inner lugs each having a an alignment groove dividing the lug into first and second lug segments, the alignment groove having an alignment groove depth; and
    at least one pulley configured to engage the inner surface of the drive belt, the at least one pulley comprising:
    a frame configured to rotate about a rotation axis, the frame having a circular outer rim with opposing sides;
    a plurality of circumferential teeth extending radially and axially from the rim, each tooth having a tooth width parallel to the rotation axis, and each tooth being configured to be received between adjacent inner lugs of the drive belt; and an alignment flange extending radially between adjacent circumferential teeth, the alignment flange being configured to be received in the alignment groove, and the alignment flange extending radially an alignment flange distance that extends a distal end of the alignment flange into the alignment groove a distance no greater than the alignment groove depth.

22. A pulley and drive belt system for a bicycle, the bicycle comprising a crank set configured for attachment to a first pulley and a rear wheel hub configured for connection to a second pulley, the pulley and drive belt system comprising:

a drive belt, the drive belt comprising a plurality of longitudinally spaced inner lugs each having a an alignment groove dividing each lug into first and second lug segments;

a first pulley configured to engage the inner surface of the drive belt, the first pulley comprising:

a frame configured for connection to the bicycle crank set for rotation about a rotation axis, the frame having a circular outer rim with opposing sides;

a plurality of circumferential teeth extending radially and axially of the rim, the teeth extending axially a tooth width at least equal to a width of the drive belt, and each tooth being configured to be received between adjacent inner lugs of the drive belt;

a second pulley configured to engage the inner surface of the drive belt, the second pulley comprising:

a frame configured for connection to the bicycle wheel hub for rotation about a rotation axis, the frame having a circular outer rim with opposing sides;

a plurality of circumferential teeth extending radially and axially of the rim, the teeth extending axially a tooth width at least equal to a width of the drive belt, and each tooth being configured to be received between adjacent inner lugs of the drive belt; and at least one of the first and second pulleys further comprising an alignment flange extending between adjacent circumferential teeth, the alignment flange being configured to be received in the alignment groove.

23. The pulley and drive belt system for a bicycle of claim 22 further comprising drive belt having a drive belt width and the alignment groove having an alignment groove width less than ⅓ the drive belt width.

24. The pulley and drive belt system for a bicycle of claim 22 further comprising the alignment flange extending no further radially from the rotation axis than the circumferential teeth, the alignment groove and the circumferential teeth being configured so that with the alignment flange received in the alignment groove, the drive belt rides on the circumferential teeth.

25. The pulley and drive belt system for a bicycle of claim 24 wherein a distal end of the alignment flange does not reach a bottom of the alignment groove.

26. The pulley and drive belt system for a bicycle of claim 22 wherein the second pulley frame further comprises a plurality of spokes between the rim and a hub connection ring, there being an axial off-set of a select distance between the connection ring and the rim, whereby upon attachment of the connection ring to the hub a position of the rim along the rotation axis can be varied depending upon which of the opposing rim sides is leading.

27. The pulley and drive belt system for a bicycle of claim 22 wherein the first pulley frame further comprises means for operative association with the crank set, the means for operative association with the crank set comprising an axial off-set of a select distance, whereby upon operative association of the first pulley frame to crank set a position of the rim along the rotation axis can be varied depending upon which of the opposing rim sides is leading.

28. A bicycle comprising:
a crank set;
a rear wheel hub; and
a pulley and drive belt system operatively associated with the crank set and the rear wheel hub, the pulley and drive belt system comprising:

a drive belt, the drive belt comprising a plurality of longitudinally spaced inner lugs each having a an alignment groove dividing each lug into first and second lug segments;

a first pulley configured to engage the inner surface of the drive belt, the first pulley comprising:

a frame configured for connection to the bicycle crank set for rotation about a rotation axis, the frame having a circular outer rim with opposing sides;

a plurality of circumferential teeth extending radially and axially of the rim, the teeth extending axially a tooth width at least equal to a width of the drive belt, and each tooth being configured to be received between adjacent inner lugs of the drive belt;

a second pulley configured to engage the inner surface of the drive belt, the second pulley comprising:

a frame configured for connection to the bicycle wheel hub for rotation about a rotation axis, the frame having a circular outer rim with opposing sides;

a plurality of circumferential teeth extending radially and axially of the rim, the teeth extending axially a tooth width at least equal to a width of the drive belt, and each tooth being configured to be received between adjacent inner lugs of the drive belt; and at least one of the first and second pulleys further comprising an alignment flange extending between adjacent circumferential teeth, the alignment flange being configured to be received in the alignment groove.

29. A pulley for use with a drive belt, the drive belt comprising a plurality of longitudinally spaced inner lugs each having a an alignment groove dividing each lug into first and second lug segments, the pulley comprising:

a frame configured to rotate about a rotation axis, the frame having a circular outer rim with opposing sides;

a plurality of circumferential teeth extending radially and axially of the rim, each tooth having a tooth width at least equal to a width of the drive belt, and each tooth being configured to be received between adjacent inner lugs of the drive belt; and an alignment flange extending between adjacent circumferential teeth, the alignment flange being configured to be received in the alignment groove, the alignment flange extending radially no further than the circumferential teeth from the rotation axis.

30. The pulley for use with a drive belt of claim 29 further comprising a debris evacuating path extending between at least one opposing side of the outer rim and the alignment flange, the debris evacuating path being free of obstacles between the at least one opposing side of the outer rim and the alignment flange.

31. The pulley for use with a drive belt of claim 29 further comprising the alignment flange have a width that is substantially constant as it extends radially to a rounded distal end.

32. The pulley for use with a drive belt of claim 29 further comprising the alignment flange having a width less than ⅓ the width of the teeth.

33. The pulley for use with a drive belt of claim 29 further comprising the alignment flange having a width less that ¼ the width of the teeth.

34. The pulley for use with a drive belt of claim 29 further comprising the alignment flange having a width less than ⅛ the width of the teeth.

35. The pulley for use with a drive belt of claim 29 further comprising the alignment flange having a width less than 1/10 the width of the teeth.

36. A kit for a bicycle comprising at least two of the following belt and first and second pulleys:
- a drive belt, the drive belt comprising a plurality of longitudinally spaced inner lugs each having a an alignment groove dividing each lug into first and second lug segments, alignment groove having an alignment groove depth; and
- a first and a second pulley, each of the first and second pulleys being configured to engage an inner surface of the drive belt, at least one of the first and second pulleys comprising:
  - a frame configured to rotate about a rotation axis, the frame having a circular outer rim with opposing sides;
  - a plurality of circumferential teeth extending radially and axially of the rim, each tooth having a width parallel to the rotation axis, and each tooth being configured to be received between adjacent inner lugs of the drive belt; and
  - an alignment flange extending radially between adjacent circumferential teeth, the alignment flange being configured to be received in the alignment groove, and the alignment flange extending no further radially than the circumferential teeth from the rotation axis, the circumferential teeth, the alignment flange and the alignment groove being configured so that with the alignment flange received in the alignment groove, the drive belt rides on the circumferential teeth.

* * * * *